US009596698B2

(12) United States Patent
Timus et al.

(10) Patent No.: US 9,596,698 B2
(45) Date of Patent: Mar. 14, 2017

(54) FULL AND PARTIAL RESOURCE ACCESS IN RAN SHARING

(75) Inventors: Bogdan Timus, Spånga (SE); Harald Kallin, Sollentuna (SE); Gunnar Mildh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/373,736

(22) PCT Filed: Feb. 9, 2012

(86) PCT No.: PCT/SE2012/050130
§ 371 (c)(1),
(2), (4) Date: Jul. 22, 2014

(87) PCT Pub. No.: WO2013/119156
PCT Pub. Date: Aug. 15, 2013

(65) Prior Publication Data
US 2015/0031361 A1  Jan. 29, 2015

(51) Int. Cl.
*H04W 28/18* (2009.01)
*H04W 36/00* (2009.01)
(Continued)

(52) U.S. Cl.
CPC ........... *H04W 72/10* (2013.01); *H04W 28/18* (2013.01); *H04W 36/0061* (2013.01);
(Continued)

(58) Field of Classification Search
CPC ..... H04W 92/02; H04W 88/06; H04W 88/08; H04W 24/02; H04W 48/18; H04W 8/18;
(Continued)

(56) References Cited

U.S. PATENT DOCUMENTS

2004/0176075 A1* 9/2004 Schwarz et al. ........... 455/414.1
2008/0146158 A1* 6/2008 Pan ....................... H04B 7/1853
455/66.1
(Continued)

FOREIGN PATENT DOCUMENTS

EP  1443790 A1 * 8/2004 ............... H04Q 7/38
EP  2190249 A2 * 5/2010 ............ H04W 28/24

OTHER PUBLICATIONS

Author Unknown, Technical Specification Group Services and System Aspects; Network Sharing; Architecture and functional description (Release 11); Technical Specification 23.251, Version 11.0.0, 3GPP Organizational Partners, Sep. 2011, 28 pages.*
(Continued)

*Primary Examiner* — Asghar Bilgrami
*Assistant Examiner* — Umair Ahsan
(74) *Attorney, Agent, or Firm* — Withrow & Terranova, PLLC

(57) ABSTRACT

The disclosure relates to a method and radio base station for sharing resources in a wireless communication system. The radio base station stores an identity of a first entity to which a first plurality of UEs is associated. The first plurality of UEs has full access to resources provided by the radio base station. The radio base station also stores an identity of a second entity to which a second plurality of UEs is associated. The second plurality of UEs has partial access to the resources provided by the radio base station. When the radio base station receives a request for accessing resources from a UE, it determines whether the UE is associated with the second entity, i.e. if the UE is to be handled in support mode. If the UE is associated with the second entity it means that the UE only should have partial access to the resources.

19 Claims, 3 Drawing Sheets

(51) Int. Cl.
  *H04W 72/04* (2009.01)
  *H04W 72/10* (2009.01)
  *H04W 36/20* (2009.01)
  *H04W 16/14* (2009.01)

(52) U.S. Cl.
  CPC ......... *H04W 36/20* (2013.01); *H04W 72/048* (2013.01); *H04W 72/0486* (2013.01); *H04W 16/14* (2013.01)

(58) Field of Classification Search
  CPC ..... H04W 48/16; H04W 60/00; H04W 16/18; H04W 16/02; H04W 16/14; H04W 16/00; H04W 16/10; H04W 16/12; H04W 28/16; H04W 72/04; H04W 28/24; H04W 28/18
  See application file for complete search history.

(56) References Cited

U.S. PATENT DOCUMENTS

| | | | |
|---|---|---|---|
| 2010/0189075 A1* | 7/2010 | Iwamura | H04W 36/0055 370/331 |
| 2011/0237238 A1* | 9/2011 | Hassan et al. | 455/422.1 |
| 2013/0029630 A1* | 1/2013 | Salkini | H04L 63/10 455/404.1 |
| 2013/0102356 A1* | 4/2013 | Shaw | 455/525 |

OTHER PUBLICATIONS

International Preliminary Report on Patentability for PCT/SE2012/050130, mailed Aug. 12, 2014, 6 pages.
International Search Report for PCT/SE2012/050130 mailed Oct. 18, 2012, 3 pages.

\* cited by examiner

FULL AND PARTIAL RESOURCE ACCESS IN RAN SHARING

This application is a 35 U.S.C. §371 national phase filing of International Application No. PCT/SE2012/050130, filed Feb. 9, 2012, the disclosure of which is incorporated herein by reference in its entirety.

TECHNICAL FIELD

The present invention relates to sharing resources, and in particular to a method and arrangement for sharing resources in a wireless communication system.

BACKGROUND

Mobile operators are known to share radio communications networks in order to share costs of network establishment, maintenance and operations, particularly in the rollout phase. Network sharing is becoming increasingly popular, due to both the high costs on deploying telecom infrastructure and due to more relaxed regulatory policies.

There are different technical approaches for how a Radio Access Network (RAN) in a cellular mobile network can be shared. One approach is for an operator to own a spectrum license and the second operator to utilize the spectrum of the first operator. This is the case of Mobile Virtual Network Operators (MVNOs), or the case of roaming.

Another approach is for each operator to own a spectrum license and for the hardware equipment to be able to separately handle the two frequency carriers, by creating logical partitions. Hence, the operators share a common hardware, but operate in their respective spectrum band independent of each other.

Yet another approach is for each operator to own a spectrum license, but to jointly use the available spectrum as a common pool of resources. Although this approach is currently not allowed by the regulatory policies in many countries, it possibly will be more widely used in the future.

In yet another scenario, the regulators may change the spectrum licensing policies, from today's policy of allocating spectrum licenses for 10-45 years, to a policy of short-term licenses, e.g., days, hours, or minutes. In this scenario, all the operators would access a common pool of resources, and the spectrum fees could be paid based on consumption. From a technical point of view, this scenario is similar or identical to the approach of using a joint pool of resources.

Additional spectrum allocation policies include scenarios where the license is only assigned for some geographical area which could range from a state or county level down to licensed for individual buildings or microwave links.

A trend related to network sharing is for operators to buy access services from a third party. A typical example is the case of tower operators, which own towers and sites, and sell antenna and base station space to operators. In this case the operators buy access to a passive shared infrastructure. However, there are also cases when the service provider owns an active shared infrastructure. In this case, the Mobile Network Operators (MNOs) are buying radio access in a quite similar way the MVNOs have done traditionally.

The operators may require different service levels from the neutral service provider, depending on the Service Level Agreement (SLA) signed between the two. Ideally, the neutral service provider should be able to sign SLAs and to provide the services to each MNO independently on the SLAs and services provided to the other operators. For instance, an MNO may decide how large should the coverage be for a certain service, in a similar way an MNO with a stand-alone network decide the pace of rolling out a network.

It is known that a radio network with more sites, i.e., with small cells and short distances between the sites, typically has better performance that a radio network with sparser sites. Since the infrastructure cost is roughly proportional to the number of installed and operated sites, there is a natural trade-off between the infrastructure cost and the network performance. The trade-off between the performance and the amount of invested money is typical for any radio network. This can be reflected for instance by the pace with which the operators decide to roll-out their networks. An operator may choose to deploy a network faster than his competitors, which means that the initial performance of the RAN will be better than the competitors' but also that the operator will have higher up-front investments and therefore take larger financial risks.

If the owner of a shared network, e.g., a neutral service provider, is to serve two MNOs with different roll-out strategies, then the number of deployed site depends on the toughest requirement set by the two operators. For instance, this means that the network may have better coverage than what one of the two operators would have liked to have and is prepared to pay for.

Consider for instance the case when an MNO would like to have access to 1000 sites during the first year, while the other MNO would like to have access only to 500 sites. If the neutral service provider is to satisfy the requirement from the first MNO, the shared network would result in 1000 sites although the second operator does not require access and is not prepared to pay or share the costs for more than 500 sites.

If the neutral service provider is to satisfy the requirements of the two MNO independently on which SLA has been agreed with the other MNO, then it will deploy 1000 sites and allow the customers of the second operator to access only half of them. The issue of pricing the services, i.e., splitting the investment costs between the two MNO, is outside the scope of the disclosure.

As long as each MNO operates on a different spectrum resource, there is no technical problem with this approach. However, if the two MNOs are sharing a common pool of resources which could be beneficial to improve the usage of spectrum resources, the end-users of the first MNO will experience performance degradation when the users of the second MNO are restricted from accessing half of the sites, as explained in the following.

FIG. 1 illustrates a shared network consisting of three base stations 111, 112, 113, which are serving three cells 121, 122, 123. A first operator buys access only to radio base station 111, while the second operator buys access to all the radio base stations. For instance, this may correspond to the case when the first operator intends to cover only a traffic hotspot, like the center of a city, while the second operator wants to cover a larger area, like the suburbs of that city. The user equipment (UE) 131 belongs to the first operator and it is connected to radio base station 111. Since the UEs of the first operator are not allowed to access radio base stations 122 and 123, the coverage of cell 121 is much larger than the coverage of cells 122 and 123. Moreover, the coverage of cell 121 overlaps with the coverage of cells 122 and 123, although they use the same pool of radio resources. However, the data-rate provided by this large cell 121 is low, exemplified by the height of curve 141. If UE 131 was allowed to connect to the other cells, then the data-rate could have been as indicated by the dashed curve 142. The problem is that, when being connected to BS 111 through the link 151, the UE 131 generates a lot of uplink interference to radio base station 113, indicated by the interfering link 152. Similarly, the radio base station 113 will generate a lot of interference to the link 151 in the downlink direction. Thus, in this scenario both operators will see degraded network performance.

Hence, the price of handling different roll-out policies with the state-of-art techniques is performance degradation, which may be too high to justify the cost savings obtained by sharing the resources.

Similar problems can be seen in scenarios where each operator has its own site placed at geographically different but bordering locations and are using the same spectrum e.g. when the spectrum allocation policy is based on location.

SUMMARY

An object is therefore to address some of the problems and disadvantages outlined above, and to provide an improved method and arrangement for sharing resources in a wireless communication system.

The above stated object is achieved by means of a method and a radio base station according to the independent claims, and by the embodiments according to the dependent claims.

In accordance with a first aspect of embodiments a method in a first radio base station for sharing resources between at least two entities is provided. The first radio base station provides resources to user equipments, UEs, in a cell. The method comprises storing an identity of at least a first entity to which a first plurality of UEs is associated, which first plurality of UEs has full access to the resources. The method further comprises storing an identity of at least a second entity to which a second plurality of UEs is associated, which second plurality of UEs has partial access to the resources. Furthermore, the method comprises receiving a request for accessing resources from a UE and determining whether the UE is associated with the second entity. If the UE is associated with the second entity the method includes determining an amount of resources to provide to the UE.

In accordance with a second aspect of embodiments a radio base station for sharing resources between at least two entities is provided. The radio base station is configured to provide resources to user equipments, UEs, in a cell and configured to store in a storage unit an identity of at least a first entity to which a first plurality of UEs is associated, which first plurality of UEs has full access to the resources. The radio base station is further configured to store in the storage unit an identity of at least a second entity to which a second plurality of UEs is associated, which second plurality of UEs has partial access to the resources. The RBS comprises a receiver adapted to receive a request for accessing resources from a UE and a processing unit adapted to determine whether the UE is associated with the second entity. Moreover, the processing unit is further adapted to determine an amount of resources to provide to the UE, if the UE is associated with the second entity.

An advantage of particular embodiments is that they provide a possibility to improve network performance in a network sharing system.

A further advantage of particular embodiments is that they provide the possibility for an infrastructure owner to provide differentiated services and independent network operations to its costumers. The embodiments allow the infrastructure owner to sell different levels of coverage to different operators which are sharing a common frequency resource, without adventuring the network performance for any of the operators.

Yet a further advantage of particular embodiments is that they provide a solution without requiring changes in the terminals, which means that it can be implemented seamlessly into the sharing network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
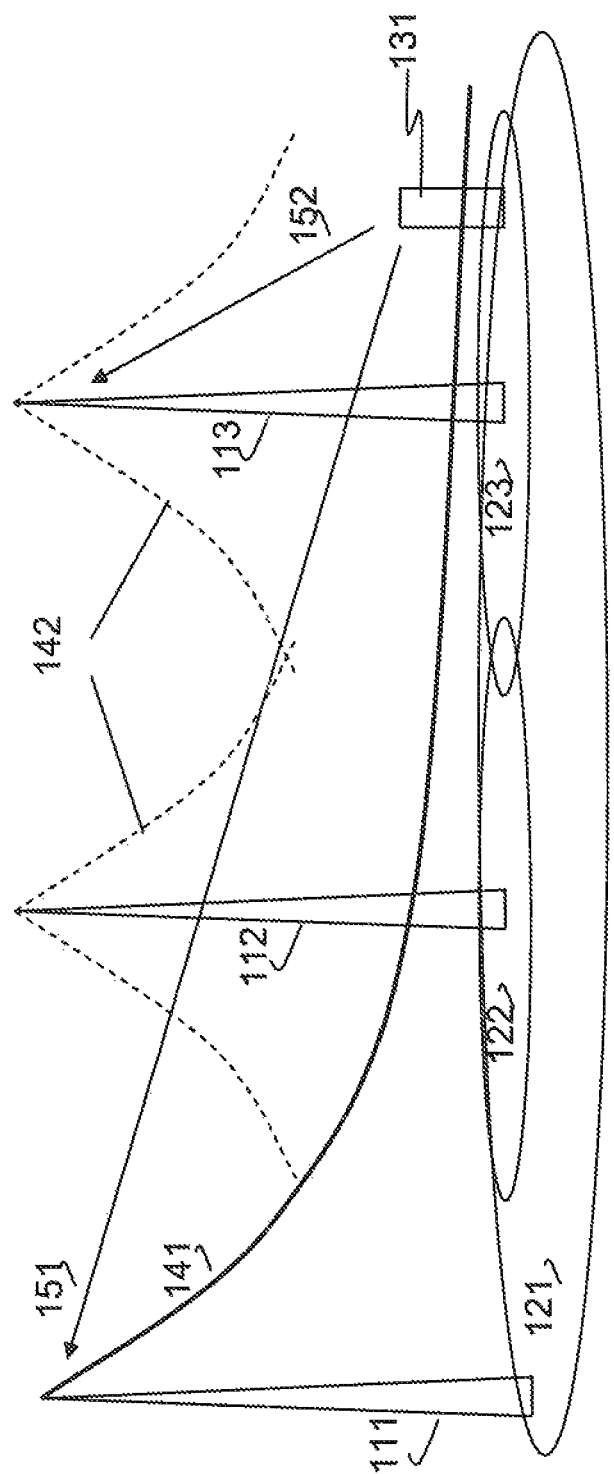
FIG. 1 illustrates a wireless communication system in which resources are shared in accordance with prior art.

In the following description, for purposes of explanation and not limitation, specific details are set forth, such as particular sequences of steps and particular device configurations in order to provide a thorough understanding of the embodiments. It will be apparent to one skilled in the art that the embodiments may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Embodiments are described herein by way of reference to particular exemplary scenarios. Particular aspects are described in a non-limiting general context in relation to a Long Term Evolution (LIE) system, wherein the radio resource management is performed in a distributed way between the radio base stations. However, the same principles could be applied to other types of radio access networks, e.g., Universal Mobile Telecommunications System (UMTS), High-Speed Packet Access (HSPA) etc. In some networks the functionality for radio resource allocation is supported by other network nodes than the radio base station, for instance in the radio network controller (RNC), in which case parts of the procedure described in the following may be supported by that network node.

Throughout this application the term "entity" is used to refer to an entity to which UEs are associated. An entity may be e.g. a mobile network operator or a group of subscribers of a mobile network operator. For instance, it may refer to a group of subscribers belonging to a corporate customer, or a group of subscribers with a particular type of subscription, or a group of subscribers with a particular type of UE, etc. The entity may be provided access to resources in a wireless communication system by purchase agreements with service providers or through roaming agreements with other entities etc. Additionally, an entity may be a mobile network operator which has an agreement with another mobile network operator providing access to the communication network including radio base stations of the latter. An example of such an agreement is a roaming agreement. Furthermore, the agreement may decide whether the entity should be provided access to a radio base station and to what extent. There are at least two categories of access, i.e. full access and partial access. It should be understood that partial access means that the UE is associated with an entity which is only supported by the RBS and should not be provided with the same amount of resources as an entity with full access. The embodiments described hereinafter disclose a radio base station and a method for sharing resources between at least two entities in a wireless communication system. According to these embodiments, resources are allocated to a UE depending on which entity it is associated with and on which resource access condition is associated to that specific entity. The radio base station stores at least one first identity of a first entity to which a first plurality of UEs is associated. The first plurality of UEs has full access to the resources provided by the radio base station. The radio base station also stores at least one second identity of a second entity to which a second plurality of UEs is associated. The second plurality of UEs has partial access to the resources provided by the radio base station, i.e., the UEs are handled in a support mode. When the radio base station receives a request for accessing resources from a UE, it determines whether the UE is associated with the second entity, i.e. if the UE is to be handled in support mode. If the UE is associated with the second entity it means that the UE only should have partial access to the resources. In that case, the radio base station determines an appropriate amount of resources to provide to the UE in order to reduce the interference in the wireless communication system and thus make the best use of the resources.

The embodiments may be implemented in the base stations belonging to an infrastructure owner which provides access services to several entities. The embodiments may also be implemented in base stations belonging to two different entities, for instance when local, i.e. geographical, spectrum licenses are used.

In embodiments further described in the following, a radio base station handles a UE in support mode when the entity to which the UE belongs does not have a license to access that radio base station. The radio base station may provide the UE with the amount of resources needed so that the user experiences the same service quality she would experience if the UE was connected to a radio base station to which it actually has access to. This means that the UEs belonging to un-authorized entities are treated independently on how the UEs of other entities are treated, and at the same time the spectrum resources are used in a more efficient way. For instance, this makes it possible to re-allocate the same spectrum resources more frequently over the geographical area since interference between different entities can be handled.

Figure 2:
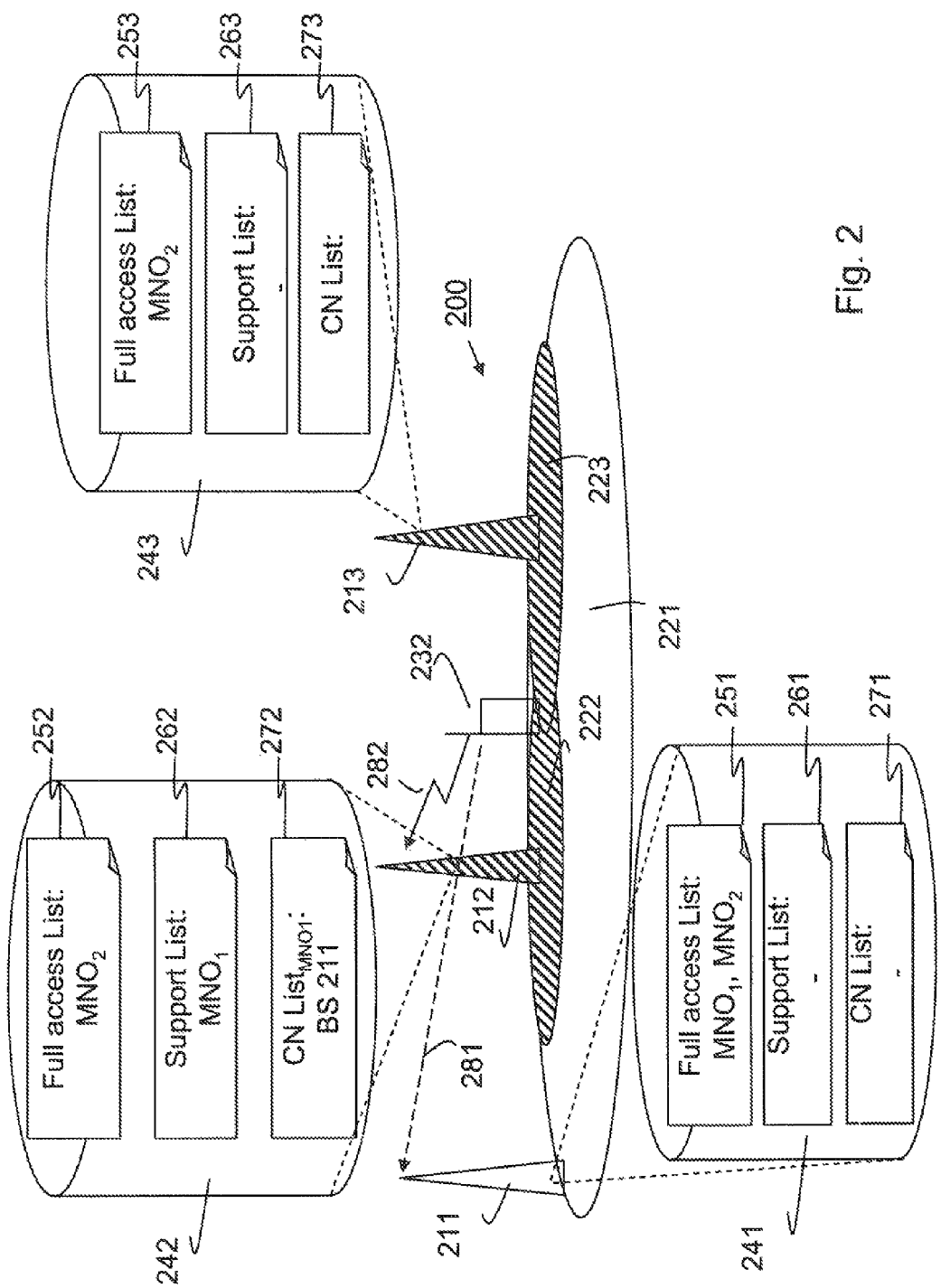
FIG. 2 shows an example of a wireless communication system in which embodiments may be implemented.

FIG. 2 illustrates an example of a wireless communication system, in which embodiments of this disclosure may be implemented. The exemplary wireless communication system may, for example, be an LTE system. For the sake of simplicity, only those parts of the communication system that are of particular relevance to the embodiments discussed herein are shown. For example, only three radio base stations (RBSs) are illustrated. However, the embodiments of the disclosure may include several RBSs.

The wireless communication system 200 comprises a first RBS 211, a second RBS 212, and a third RBS 213, which are serving three cells 221, 222, 223, respectively. Each RBS 211, 212, 213 serves a plurality of user equipments (not shown) in the serving cell 221, 222, 223, respectively. The user equipments (UEs) in the serving cell are able to communicate with the RBS via a number of uplink channels and a number of downlink channels. The RBS provides resources such as spectrum resources to the UEs in the serving cell. A RBS is a general term for a radio network node capable of transmitting radio signals. A RBS may e.g. be a macro base station, a micro base station, a NodeB, an eNodeB, or a relay node.

UEs associated with an entity may have either full access or partial access to the resources provided in a serving cell. If the UEs have full access to the resources the RBS will handle the UEs in a normal mode, for instance as described by the 3GPP standard and prior art methods. However, if the UEs have partial access to the resources provided in the serving cell the RBS will handle the UEs in a support mode which will be described in the following.

In the scenario illustrated in FIG. 2, UEs belonging to an entity $MNO_1$, e.g. a mobile network operator, have full access to the first RBS 211. The same applies to UEs belonging to other entities which he access to RBS 211, e.g., $MNO_2$. An identity of each entity $MNO_1$ and $MNO_2$, respectively, to which the UEs with full access are associated, is stored in the first RBS 211. The identities may be stored in a full access list 251 comprising identities of entities associated with UEs which have full access to the resources provided by the first RBS 211. The identities may for instance be a PLMN number of the mobile network operator. The full access list 251 may be stored in a storing unit 241 such as a memory unit comprised in the RBS 211, Furthermore, UEs associated with the second entity $MNO_2$ also has full access to the second RBS 212 and the third RBS 213. The identity of the second entity $MNO_2$ is also stored in the second RBS 212 and the third RBS 213. The identity may be stored in a full access list 252, 253 comprising identities of entities associated with UEs which have full access to the resources provided by the second RBS 212 and the third RBS 213, respectively. The full access lists 252, 253 may be stored in storing units 242, 243 such as memory units comprised in the second RBS 212 and the third RBS 213, respectively.

In exemplary embodiments the identity may be provided as a Mobile Country code (MCC), a Mobile Network Code (MNC), a Mobility Management Entity Identity (MME ID) of the MME serving the UEs, or a Globally Unique MME ID (GUMMEI).

Furthermore, the second RBS 212 is configured to support all UEs which are associated with the first entity $MNO_1$. UEs which are associated with the first entity $MNO_1$ shall have partial access to the resources provided by the second RBS 212. The second RBS 212 shall handle the UEs in a support mode. The identity of the first entity $MNO_1$ is stored in the second RBS 212. The identity may be stored in a support list 262 comprising identities of entities associated with UEs which have partial access to the resources provided by the second RBS 212. The support list 262 may also be stored in the storing unit 242 comprised in the second RBS 212. In the scenario illustrated in FIG. 2, the third RBS 213 is not configured to support the UEs which are associated with the first entity $MNO_1$ or any other UEs associated with any further entities. Hence, the support list 263 of the third PBS 213 is empty. Moreover, the first RBS 211 is not configured to support any other UEs which are associated with any further entities and therefore also the support list 261 of the first RBS 211 is empty.

The second RBS 212 will provide access to UEs associated with the entities on both the full access list 252 and the support list 262. This means that the RBS 212 broadcasts support information for all UEs associated with the entities on both lists 252, 262, i.e. for the first entity $MNO_1$ and the second entity $MNO_2$, and that the RBS 212 is prepared to accept access requests from UEs associated with all entities on both lists 252, 262. The first RBS 211 broadcasts support information for UEs associated with the first entity $MNO_1$ or the second entity $MNO_2$ and the third RBS 213 broadcasts support information for UEs associated with the second entity $MNO_2$ only.

The configuration of the full access lists 251, 252, 253 and the support lists 261, 262, 263 may be performed using an Operation and Maintenance (OAM) node or system or a core network node. In an exemplary embodiment a configuration message may be extended to contain additional information on the identity of the entity to which a first plurality of UEs is associated, which first plurality of UEs has full access to the resources provided by the RBS, and/or the identity of the entity to which a second plurality of UEs is associated, which second plurality of UEs has partial access to the resources provided by the RBS. In the scenario illustrated in FIG. 2, a configuration message sent to the second RBS 212 may contain additional information on the identity of the first entity $MNO_1$, and the identity of the second entity $MNO_2$.

In an exemplary embodiment, the OAM node may configure the lists upon installation of the radio base and may reconfigure the lists when the radio network is changed, e.g., when new devices are installed, some devices temporarily switched off, new features installed, etc. The OAM node may also update the lists when access rights of an entity are changed, for instance when the contract between an MNO and the infrastructure owner is modified.

A UE may request resources in the wireless communication system. The RBS broadcasts support information for UEs associated with entities comprised in both the full access list and the support list. The UE associated with any of the entities comprised in either list may then send a request for accessing resources to the RBS. Upon reception of a request from the UE the RBS determines whether the UE is associated with an entity comprised in the full access list or the support list. If the identity of the entity associated with the UE would be comprised in the full access list, the request of the UE is handled as described by the current 3GPP standard or other prior art methods. However, if the entity associated with the UE is included in the support list the target RBS will accept the UE in a support mode, and will determine an amount of resources to provide to the UE. Thus, the RBS will handle the UE in support mode in a different way than a UE associated with an entity comprised in the full access list.

In the scenario illustrated in FIG. 2, a $UE_{MNO1}$ 232 which is associated with the first entity $MNO_1$ would like to request resources in the wireless communication system 200. The first RBS 211 and the second RBS 212 have broadcasted support information for UEs associated with the first entity $MNO_1$ as previously described. The $UE_{MNO1}$ 232 may then send a request for accessing resources to the second RBS 212. Upon reception of the request from the $UE_{MNO1}$ 232 the second RBS 212 determines whether the $UE_{MNO1}$ 232 is associated with an entity comprised in the full access list 252 or the support list 262. In this case the $UE_{MNO1}$ 232 is associated with the entity $MNO_1$ which is included in the support list 262. The second RBS 212 will accept the $UE_{MNO1}$ 232 in a support mode and determine an amount of resources to provide to the $UE_{MNO1}$ 232.

An active UE may be handed over to the cell 222 served by the second RBS 212 if the active UE is associated to an entity which identity is comprised in either of the two lists 252, 262. If the identity of the entity associated with the UE is comprised in the full access list 252, then the handover procedure will be as performed as described by the current 3GPP standard or other prior art methods. However, if the entity associated with the UE is in the support list 262, the target RBS, i.e. the second RBS 212, will accept the UE in a support mode, and determine an amount of resources to provide to the UE. In prior art methods a handover request is rejected if the UE is not comprised in a list of mobile network operator who have access to the RBS either directly or through a roaming agreement.

It should be mentioned that the second RBS 212 may reject handover requests from UEs associated with an entity which is not included in any of the two lists 252, 262. I.e. such an entity would not have access to the second RBS 212 nor have an agreement with another entity providing access to the second RBS 212.

In an exemplary embodiment, the identities of the entities, the full access list and/or the support list may be transferred between the RBSs, for example at handover as a part of the UE context. The identities of the entities, the full access list and/or the support list can then be used in the RBS to determine if a neighboring cell is configured to provide full access or partial access to the resources to a particular UE.

Previously mentioned, the PBS determines the amount of resources to provide to the UE in support mode. The determination of the amount may be performed in various ways. In an exemplary embodiment the PBS determines a data-rate the UE would receive in the serving cell if the UE would have full access to the resources in the cell. Thereupon the RBS may determine the amount of resources to provide to the UE in support mode based on the determined data-rate. For example, the RBS may determine that the UE will receive an amount corresponding to a certain percentage of the determined data-rate. Moreover, the percentage may be predetermined as a fixed value stored in the PBS or the percentage may be calculated in the RBS. In an exemplary embodiment the RBS determines a data-rate the UE would receive in any of the neighboring cell. Thereupon the PBS may determine the amount of resources to provide to the UE in support mode based on the determined data-rate. For example, the RBS may determine that the UE will receive an amount corresponding to a certain percentage of the determined data-rate. Moreover, the percentage may be predetermined as a fixed value stored in the RBS or the percentage may be calculated in the RBS.

In an exemplary embodiment, the RBS will store cell information on neighboring cells for each entity comprised in the support list. The RBS may create a cell neighboring list for each entity comprised in the support list. The cell neighboring list may comprise information on the neighboring cells of which the entity has access to. For example, the support list of a RBS may comprise three different entities $MNO_A$, $MNO_B$ and $MNO_C$. The cell neighboring list for $MNO_A$ includes cell information of $RBS_i$, $RBS_j$ and $RBS_k$, if the UEs associated with $MNO_A$ have full access to the resources provided by $RBS_i$, $RBS_j$ and $RBS_k$. The cell neighboring list for $MNO_B$ includes cell information of $RBS_j$ and $RBS_k$, if the UEs associated with $MNO_B$ have full access to the resources provided by $RBS_j$ and $RBS_k$. The cell neighboring list for $MNO_C$ includes cell information of $RBS_i$, if the UEs associated with $MNO_B$ have full access to the resources provided by $RBS_i$. The cell information may be transferred between RBSs in the shared network and/or received from the OAM node or system or the mobile core network node.

In the scenario illustrated in FIG. 2, the support list 252 of the second RBS 212 comprises entity $MNO_1$. Consequently, the second RBS 212 will store information for $MNO_1$ comprising cell information on the neighboring cell 221 served by the first RBS 211. The information may be comprised in a cell neighboring list 272 comprised in the storing unit 242. The cell information may comprise information relating to which cell and/or RBS in the wireless communication system should have handled the request of the UE if the present RBS would not support the UE. For example, the cell neighboring list 272 of the second RBS 212 may comprise the cell information that the first RBS 211 and/or the first cell 221 should have handled the request of the $UE_{MNO1}$ 232 if the second RBS 212 did not support the $UE_{MNO1}$. In FIG. 2 this specific cell information is illustrated as "BS 211" in the cell neighboring list 272. Moreover, the storing unit 242 may also comprise a cell neighboring list for entities included in the full access list 252, e.g. $MNO_2$. The cell neighboring list may contain cell information of both RBS 211 and RBS 213 (alternatively cells 221 and 223). Due to the support lists 261, 263 of the first RBS and third RBS, respectively, are empty also the corresponding cell neighboring lists 271 and 273 are empty in the scenario illustrated in FIG. 2.

Unlike the state of the art handover mechanisms, in which each cell has a unique cell neighboring list, the exemplary embodiment may use the plurality of cell neighboring lists in order to apply different handover procedures on the UEs, depending on which entities they are associated with.

In an exemplary embodiment, the cell information may comprise information about the amount of resources that would have been allocated to the UE, if it would have been served by the specific neighboring cell. The RBS may then determine the amount of resources to provide to the UE based on the cell information. Cell information may also comprise radio characteristics, load information, radio distance, geographical distance, information relating to scheduling, and resource reservation mechanisms of the cell. Radio characteristics may be received signal power, received interference, signal to noise ratio, signal to interference ratio, received pilot or reference symbol power, other measurements relating to fading, time dispersion etc. Data-rates dependent on the cell information may be preconfigured in the RBS and may serve as a basis for determining a data-rate. The serving RBS may then determine the amount of resources to provide to the UE in support mode based on the determined data-rate.

In an exemplary embodiment the cell information may include the geographical distance between the serving RBS and the RBS in the cell neighboring list. Data-rates dependant on geographical distance may be preconfigured in the serving RBS and may serve as a basis for determining a data-rate. The serving RBS may then determine the amount of resources to provide to the UE in support mode based on the determined data-rate. For example, the amount of resources provided to the UE may be decreased with a growing geographical distance. The service of the UE in support mode is then gracefully degraded in the shared network. In case the geographical distance exceeds a certain maximum distance the serving RBS may stop offering services to the UE, or alternatively hand over the UE to another frequency band or Radio Access Technology (RAT).

In yet another exemplary embodiment, the coil information may include the radio distance between the serving RBS and the RBS in the cell neighboring list. The radio distance may serve as a basis for determining the data-rate in the same manner as described for the geographical distance. The radio distance may be preconfigured by the OAM node or it may be based on measurements on the radio interface and on exchange of information between RBSs. For instance, the radio propagation attenuation, also called coupling loss or pathloss, can be used as metric for the radio distance.

In an exemplary embodiment, the cell neighboring list may provide the RBS with information about the load in the cells served by the RBSs serving the entity in the support list. The load information of a specific cell is associated with the data-rate which the UE would have experienced if it would be connected to that specific cell. In an exemplary embodiment, the load information comprised in the cell neighboring list may refer to an average number of available resource elements in that specific cell. Data-rates dependent on the cell information may be preconfigured in the RBS and may serve as a basis for determining a data-rate. The serving RBS may then determine the amount of resources to provide to the UE in support mode based on the determined data-rate.

In an exemplary embodiment, besides estimating the data-rate that would have been provided by the cells to which the UE has full access based on load information in those cells, the serving RBS may also measure or estimate a data-rate the serving RBS is capable of to provide to the UE. Such an estimate may be provided by the used modulation scheme in the RBS. The RBS may then determine the amount of resources to provide to the UE in support mode based on the measured or estimated data-rate.

In the exemplary embodiment previously described, the RBS determines the amount of resources to provide to the UE based on an estimation of a data-rate which the UE in support mode should have obtained if it was handled by one of the neighboring cells in which the UE has full access to the resources. The RBS may throttle the data traffic for the UE in support mode by limiting the amount of resources provided to the UE in support mode. Thus, the RBS emulates the service level provided by the neighboring cell in which the UE would have full access to the resources, yet it avoids the negative impact on the rest of the wireless communication system which the UE would have created otherwise. The quality of the estimated data-rate may vary depending on the requirements on fairness between the entities sharing the resources in the wireless communication system. There may be a tradeoff between the needed accuracy and the amount of measurement and/or processing needed to achieve this accuracy. In an exemplary embodiment the RBS will throttle the data traffic for the UE in support mode by providing the UE with the amount of resources based on at least one of the load, link performance, service requirements in the serving cell etc.

In the scenario illustrated in FIG. 2, the second RBS 212 estimates a data-rate the $UE_{MNO1}$ 232 should have received if it was connected to the first RBS 211, over a fictional link 281 between the first RBS 211 and the UE 232. Thereafter, it provides service to the $UE_{MNO1}$ 232 over a link 282 between the second RBS 212 and the UE 232, but providing only the estimated data-rate the $UE_{MNO1}$ 232 would have obtained over the fictional link 281. The data-rate determined to be provided over the link 282 between the second RBS 212 and the UE 232 is typically much lower than the data-rate that could have been provided over the same link 282 if the UE would have full access to the resources provided by the second RBS 232. Since the data-rate provided by the second RIBS 212 to the UE 232 is lower than the data-rate the second RBS 232 is capable to provide the UE 232 with, the second RBS 212 must throttle the data traffic of the UE 232, for instance by scheduling it with lower priority, or more seldom.

In an exemplary embodiment the estimation of the data-rate is performed by estimating data-rates the UE in support mode would have received in all neighboring cells. The estimation depends on selected modulation scheme, and additionally on signal quality in the neighboring cells. For example in LTE, the serving RBS may configure the UE to perform and report Reference Signal Received Power level (RSRP) from various RBSs. By requesting the UE to perform measurements on the cells in the cell neighboring list, the RBS may estimate signal quality (SINR) in the cells to which the UE has full access. In the scenario illustrated in FIG. 2, the second RBS 212 may request the $UE_{MNO1}$ 232 to perform measurements and report the RSRP received by the $UE_{MNO1}$ 232 from the first RBS 211 over the link 281 between the first RBS 211 and the $UE_{MNO1}$ 232. In a similar way, the second RIBS 212 may request measurements from other cells, which would have generated interference. Thereupon the second RBS 212 may estimate which signal quality the $UE_{MNO1}$ 232 would have, if it would be served by the neighboring RBSs. The estimation of the data-rate may then be based on the signal quality in all neighboring cells.

In an exemplary embodiment, the RBS may use the estimated data-rate for the UE in support mode as the target for the data-rate or for the data-rate per resource block, and then use this target to decide how to schedule the UE. In the scenario illustrated in FIG. 2, the data-rate over the link 281 between the first RBS 211 and the UE 232 is estimated to be very low, and the second RBS 212 will schedule the $UE_{MNO1}$ 232 in very few radio blocks, even if the data-rate over the link 282 is very high and even if the load in the cell 222 is low.

In an exemplary embodiment the RBS may also send information about the determined amount of resources which is provided to the UE in the support mode to the RBSs included in the cell neighboring lists. The information may be used in the receiving RBS to update the load measurement information of the receiving RBS. For instance, assume that the second RBS 212 in FIG. 2 uses 5% of its available resources in order to provide the UE 232 in support mode with a certain service level $X_{high}$, e.g. 1 Mbps. The second RBS 212 sends to the first RBS 211, among other type of information, the information about the load for supporting UE, 232, e.g. 5% of its available resources in order to provide service level $X_{high}$. Assume that, based on this information, the first RBS 211 estimates that it would require 50% of its own resources to support UE 232 in full access mode, i.e., if the second RBS 212 was not handling UE 232 in support mode. Furthermore, assume that the first RBS 211 is already using more than 50% of its resources, which means it would not be able to provide the same service level $X_{high}$ to the UE 232. Assume instead that it would only be able to provide a lower service level, for instance $X_{low}$=500 kbps. Hence the first RBS 211 updates its own load to a high value, for instance 100% resource utilization, and sends this information back to the second RBS 212. Based on this information, the second RBS 212 further reduces the amount of resources allocated to UE 232, for instance so that it corresponds to the service level $X_{low}$=500 kbps. A particular case is when the first RBS 211 would not be able to serve UE 232 at all, for instance when $X_{low}$=0 kbps, in which case the second RBS 212 may not serve UE 232 either.

The exchange of information between RBSs allows for gradual roll-out into the wireless communication system. The RBS configured with the possibility of sharing resources in accordance with the disclosure to coexist with RBS of older types or from other equipment suppliers not configured the same possibility. This is an advantage for a shared network, which is likely to be created by consolidating or merging two or more incumbent networks. In an exemplary embodiment, the RBS determines the amount of resources to provide to the UE based on whether the UE is handled by a cell which is not part of the service area of the entity to which the UE is associated. The determined amount of resources to provide to the UE in support mode may be expressed as an absolute maximum level of an amount of resources, not to be exceeded, or as a percentage of what would be the possible amount of resources to provide to a LIE having full access to the resources. The determined amount of resources to provide to the UE in support mode may be the same for all UEs in support mode when being outside the service area, or they can be cell specific, e.g. to enable an operator to provide some service from in-building sites in the capital, but to provide no service at all outside the capital.

Figure 3:
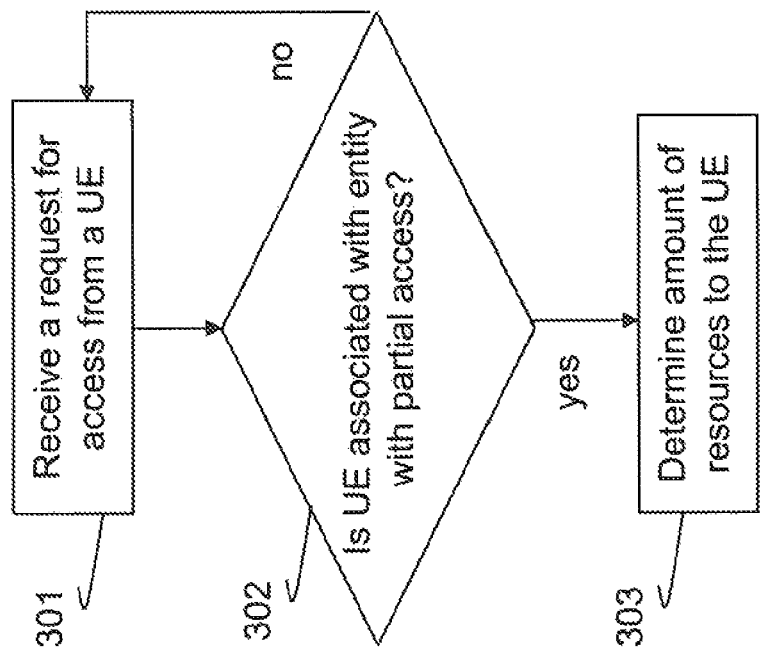
FIG. 3 is a flowchart illustrating an exemplary embodiment of the method.

FIG. 3 is a flowchart illustrating an exemplary embodiment of a method in a RBS for sharing resources between at least two entities. The RBS provides resources to UEs in a serving cell. The RBS stores at least one first identity of a first entity to which a first plurality of UEs is associated. The first plurality of UEs has full access to the resources provided by the RBS. The RBS also stores at least one second identity of a second entity to which a second plurality of UEs is associated. The second plurality of UEs has partial access to the resources provided by the RBS. In a first step 301 the RBS receives a request for accessing resources from a UE. The RBS determines in a next step 302 whether the UE is associated with the second entity, i.e. if the UE is to be handled in support mode. If the UE is associated with the second entity, i.e. the UE has partial access to the resources, the RBS determines in a further step 303 an amount of resources to provide to the UE. The determination of the amount of resources to provide to the UE may be performed in various ways as described in connection with the embodiments previously disclosed.

A RBS may be operated by a control processor or a processing unit, which typically and advantageously is a suitably programmed digital signal processor. The processing unit typically provides and receives control and other signals from various devices in the RBS. The processing unit may exchange information with a scheduler and selector, which receives digital words to be transmitted to respective UEs or to be broadcast from a suitable data generator included in the RBS. The scheduler and selector implements resource block and resource element (RB/RE) scheduling and selection in an LTE system, for example, and implements code allocation, for example, in other communication systems.

The processing unit can be configured to monitor the load on the RBS, which can be determined for example simply by counting the resource blocks (RBs) and resource elements (REs) to be transmitted in a subframe, frame, or group of them. A processor such as the processing unit can also be configured as a traffic analyzer that determines the load on a RBS by monitoring the RBS buffer status, e.g., how much data is waiting for available bandwidth to be transmitted to all connected UEs in relation to the number of RBs and REs being and recently transmitted. The processing unit can also be configured as a traffic analyzer that analyzes the cell information in the cell neighboring lists, e.g., determining the load on a neighboring RBS. The processing unit is suitably configured to implement other steps of methods described above. Cell information may be used to generate a modulation signal suitable for the particular communication system.

Figure 4:
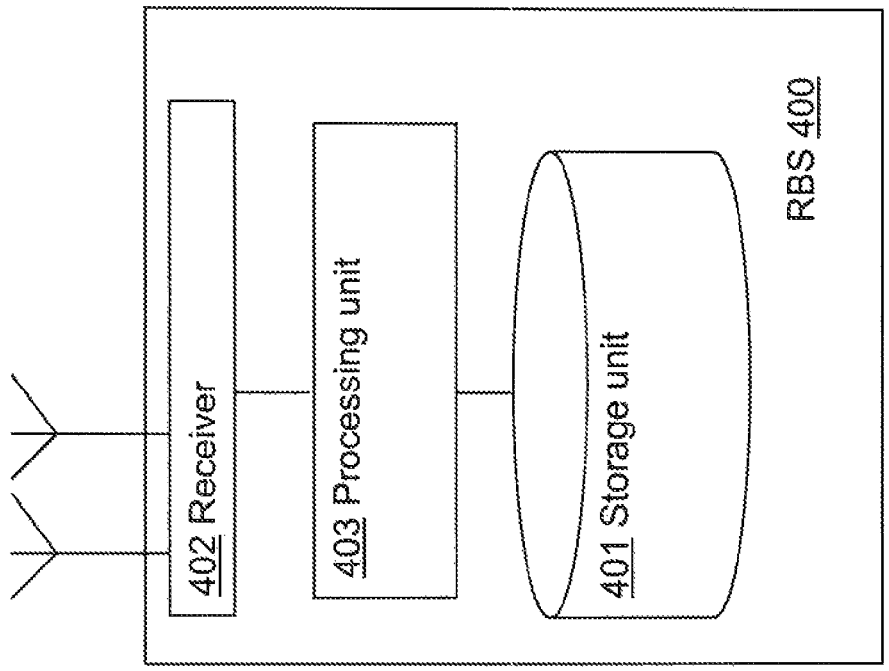
FIG. 4 is a block diagram illustrating an exemplary embodiment of a radio base station.

FIG. 4 is a block diagram illustrating an embodiment of a RBS 400 for sharing resources between at least two entities. The RBS 400 can communicate with UEs by implementing the methods described above. The RBS 400 is configured to provide resources to UEs in a cell. It is further configured to store, in a storage unit 401, at least one first identity of a first entity to which a first plurality of UEs is associated. The first plurality of UEs has full access to the resources provided by the RBS 400. The RBS 400 is further configured to store, in the storage unit 401, at least one second identity of a second entity to which a second plurality of UEs is associated. The second plurality of UEs has partial access to the resources provided by the RBS 400. The RBS 400 comprises a receiver 402 adapted to receive a request for accessing resources from a UE. Moreover, the RBS 400 includes a processing unit 403 adapted to determine whether the UE is associated with the second entity, i.e. determine if the UE is to be handled in support mode. The processing unit 403 is additionally adapted to determine an amount of resources to provide to the UE, if the UE is associated with the second entity. The determination of the amount of recourses to provide to the UE may be performed in various ways as described in connection with the embodiments previously disclosed.

It will be appreciated that the methods and devices described above can be combined and re-arranged in a variety of ways, and that the methods can be performed by one or more suitably programmed or configured digital signal processors and other known electronic circuits (e.g., discrete logic gates interconnected to perform a specialized function, or application-specific integrated circuits). Many aspects of the embodiments are described in terms of sequences of actions that can be performed by, for example, elements of a programmable computer system. UEs embodying this disclosure include, for example, mobile telephones, pagers, headsets, laptop computers and other mobile terminals, and the like. Moreover, this disclosure can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The embodiments may, of course, be carried out in other ways than those specifically set forth herein without departing from essential characteristics of the embodiments described. The present embodiments are to be considered in all respects as illustrative and not restrictive.

The invention claimed is:

1. A method in a first radio base station, RBS, for sharing resources between at least two entities, the first RBS provides resources to user equipments, UEs, in a cell, comprising storing an identity of at least a first entity to which a first plurality of UEs is associated, which first plurality of UEs has full access to the resources, and an identity of at least a second entity to which a second plurality of UEs is associated, which second plurality of UEs has partial access to the resources, the method comprising:
   receiving, by the first RBS, a request for accessing resources from a UE,
   determining, by the first RBS, that the UE is associated with the second entity,
   determining, by the first RBS, a data-rate the UE would receive in a neighboring cell served by a second RBS based on at least one of a geographical distance and a radio distance of the neighboring cell where the UE has full access to resources provided by the second RBS and is in a coverage of the neighboring cell,
   determining, by the first RBS, a reduced amount of resources to provide to the UE based on the determined data-rate, in response to determining that the UE is associated with the second entity, and
   providing the reduced amount of resources to the UE.

2. The method according to claim 1, further comprising determining, by the first RBS, a data-rate the UE would receive in the cell if the UE would have full access to the resources in the cell and wherein the determination of the amount of resources to provide to the UE is further based on the determined data-rate the UE would receive in the cell if the UE would have full access to the resources in the cell.

3. The method according to claim 1, further comprising storing, by the first RBS, cell information of at least the neighboring cell, and wherein the determination of the amount of resources to provide to the UE is further based on the cell information.

4. The method according to claim 3, wherein the cell information of the neighboring cell comprises at least one of radio characteristics, load information, and data-rates of the neighboring cell.

5. The method according to claim 3, further comprising receiving, by the first RBS, the cell information from an operation and maintenance node or a mobile core network node or the second RBS.

6. The method according to claim 1, wherein the determined amount of resources provided to the UE is handled with a lower priority than resources provided to a UE which is associated with the first entity, when handled in the first RBS.

7. The method according to claim 1, further comprising receiving, by the first RBS, the identity of the first entity and the identity of the second entity from a core network node or an operation and maintenance node or the second RBS.

8. The method according to claim 1, further comprising transferring, by the first RBS, the identity of the first entity and the identity of the second entity to another RBS when a handover is performed.

9. The method according to claim 1, wherein the entity to which a plurality of UE is associated is a mobile network operator or a group of subscribers of a mobile network operator.

10. A radio base station, RBS, for sharing resources between at least two entities, the RBS is configured to provide resources to user equipments, UEs, in a cell and configured to store in a storage unit an identity of at least a first entity to which a first plurality of UEs is associated, which first plurality of UEs has full access to the resources, and an identity of at least a second entity to which a second plurality of UEs is associated, which second plurality of UEs has partial access to the resources, the RBS comprises
   a receiver adapted to receive a request for accessing resources from a UE, the RBS further comprises, and a processing unit adapted to:

determine that the UE is associated with the second entity;

determine a data-rate the UE would receive in a neighboring cell served by a second RBS based on at least one of a geographical distance and a radio distance of the neighboring cell where the UE has full access to resources provided by the second RBS and is in a coverage of the neighboring cell;

determine a reduced amount of resources to provide to the UE based on the determined data-rate, in response to determining that the UE is associated with the second entity; and provide the reduced amount of resources to the UE.

11. The RBS according to claim 10, wherein the processing unit is further adapted to determine a data-rate the UE would receive in the cell if the UE would have full access to the cell and wherein the processing unit is adapted to determine the amount of resources to provide to the UE based on the determined data-rate the UE would receive in the cell if the UE would have full access to the resources in the cell.

12. The RBS according to claim 10, wherein the storage unit is further adapted to store cell information of at least one cell served by the second RBS to which resources the second entity has full access, and wherein the processing unit is adapted to determine the amount of resources to provide to the UE further based on the cell information.

13. The RBS according to claim 12, wherein the cell information comprises at least one of radio characteristics of the cell, load information and data-rates provided in the cell.

14. The RBS according to claim 12, wherein the receiver is further adapted to receive the cell information from an operation and maintenance node or a core network node or the second RBS.

15. The RBS according to claim 10, wherein the determined amount of resources provided to the UE is handled with a lower priority than resources provided to a UE which is associated with the first entity, when handled in the RBS.

16. The RBS according to claim 10, wherein the receiver is further adapted to receive the identity of the first entity and the identity of the second entity from a mobile core network node or an operation and maintenance node or the second RBS.

17. The RBS according to claim 10, further comprising a transmitter adapted to transfer the identity of the first entity and the identity of the second entity to another RBS when a handover is performed.

18. The RBS according to claim 10, wherein the entity to which a plurality of UE is associated is a mobile network operator or a group of subscribers of a mobile network operator.

19. The method according to claim 1, wherein determining the amount of resources to provide to the UE comprises determining an amount of resources to be used to emulate a fictional link between the UE and the second RBS.

* * * * *